United States Patent [19]
Chigodo et al.

[11] Patent Number: 5,507,011
[45] Date of Patent: Apr. 9, 1996

[54] HIGH-FREQUENCY SWITCH INCLUDING STRIP LINE AND TWO SWITCHING DIODES

[75] Inventors: Yoshikazu Chigodo; Harufumi Mandai, both of Nagaokakyo, Japan

[73] Assignee: Murata Manufacturing Co., Ltd., Japan

[21] Appl. No.: 172,123

[22] Filed: Dec. 21, 1993

[30] Foreign Application Priority Data

Dec. 22, 1992 [JP] Japan .................................. 4-357126
Dec. 26, 1992 [JP] Japan .................................. 4-358138

[51] Int. Cl.⁶ ........................... H04B 1/44; H01P 1/10
[52] U.S. Cl. ....................... 455/82; 455/83; 333/101
[58] Field of Search ........................ 455/78, 80, 82, 455/83; 333/101, 103

[56] References Cited

U.S. PATENT DOCUMENTS

| | | | |
|---|---|---|---|
| 3,452,299 | 6/1969 | Angel | 455/83 |
| 4,055,807 | 10/1977 | Priniski et al. | 455/83 |
| 5,023,935 | 6/1991 | Vancraeynest | 455/83 X |
| 5,193,218 | 3/1993 | Shimo | 455/83 X |

*Primary Examiner*—Chi H. Pham
*Attorney, Agent, or Firm*—Ostrolenk, Faber, Gerb & Soffen

[57] ABSTRACT

A transmitting circuit is connected to an antenna via a first diode. The antenna is connected to a receiving circuit with the circuit including a strip line and a second diode. Two diodes are turned ON by applying a positive voltage to a first control terminal. In this state, a signal from the transmitting circuit is transmitted from the antenna. The transmission signal is not transferred to the receiving circuit side due to a series resonance circuit with the inductance of the second diode and a capacitor. When the high-frequency switch is used for reception, a positive voltage is applied to a second control terminal. The voltage is divided by a resistors respectively connected to the diodes in parallel, and applied to the diodes as a backward voltage. And hence, the diodes are surely maintained in the OFF state. The isolation between the transmitting circuit and the antenna is improved by a parallel resonance circuit with the capacitance of the first diode and a inductor.

13 Claims, 11 Drawing Sheets

FIG. 18
PRIOR ART

HIGH-FREQUENCY SWITCH INCLUDING STRIP LINE AND TWO SWITCHING DIODES

BACKGROUND OF THE INVENTION

1. Field of the Invention

The present invention relates to a high-frequency switch, particularly, it relates to a high-frequency switch and more for switching a signal path in a high-frequency circuit of a digital portable telephone and the like.

2. Description of the Prior Art

Figure 13:
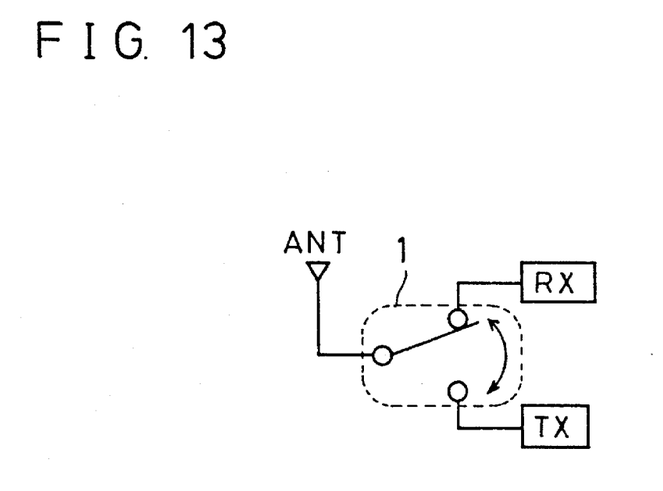
FIG. 13 is a conception view showing the operation of a high-frequency switch.
Figure 14:
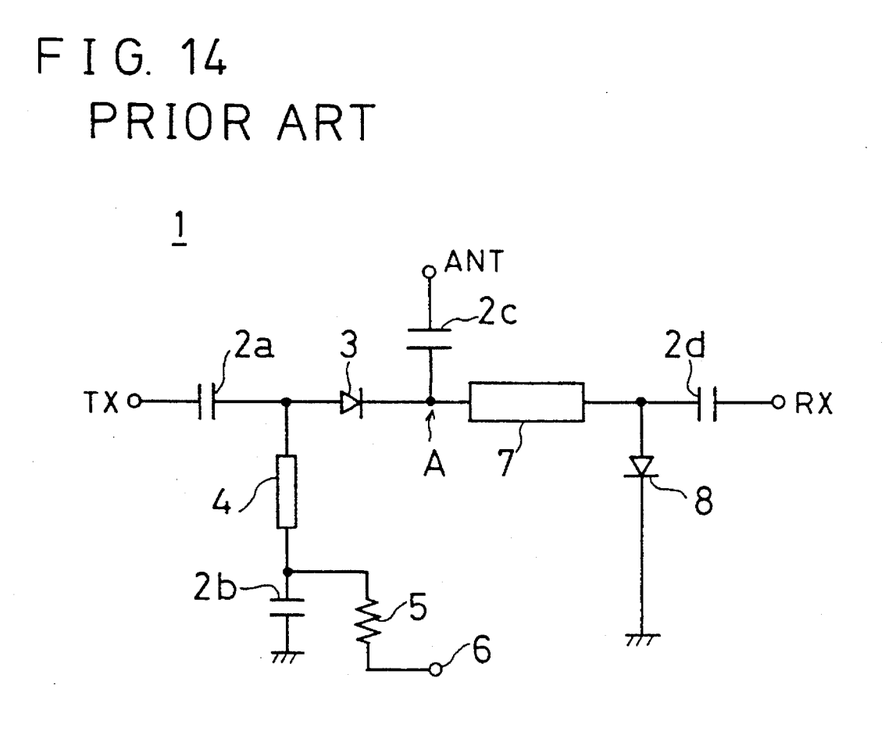
FIG. 14 is a circuit diagram showing an example of a conventional high-frequency switch which serves as a background of the present invention.

As shown in FIG. 13, a high-frequency switch is used for switching the connection between a transmitting circuit TX and an antenna ANT, and the connection between a receiving circuit RX and the antenna ANT in a digital portable telephone and the like. As shown in FIG. 14, the high-frequency switch 1 is connected to the antenna ANT, transmitting circuit TX and receiving circuit RX. An anode of a first diode 3 is connected to the transmitting circuit TX via a capacitor 2a. The anode of the first diode 3 is grounded via a series circuit of a first strip line 4 and a capacitor 2b. A control terminal 6 is connected to an intermediate point between the first strip line 4 and the capacitor 2b via a resistor 5. A control circuit for switching the high-frequency switch 1 is connected to the control terminal 6. A cathode of the first diode 3 is connected to the antenna ANT via a capacitor 2c.

The receiving circuit RX is connected to the capacitor 2c connected to the antenna ANT via a series circuit of a second strip line 7 and a capacitor 2d. An anode of a second diode 8 is connected to an intermediate point between the second strip line 7 and the capacitor 2d. A cathode of the second diode 8 is grounded.

In the case of transmission using the high-frequency switch 1, a positive voltage is applied to the control terminal 6. The first diode 3 and the second diode 8 are turned ON by this voltage. It is so arranged that, a DC current is blocked by the capacitors 2a, 2b, 2c and 2d, so that the voltage applied to the control terminal 6 is applied only to a circuit including the diodes 3 and 8. Since the diodes 3 and 8 have been turned ON, a signal from the transmitting circuit TX is sent to the antenna ANT and transmitted from the antenna ANT. Since the resonance is given at a frequency of the transmission signal of the transmitting circuit TX by grounding the second strip line 7 by the second diode 8 and its impedance becomes infinite, the signal is not transferred to the receiving circuit RX. At the time of reception, the first diode 3 and the second diode 8 are turned OFF by not applying the voltage to the control terminal 6. And hence, a receiving signal is transferred to the receiving circuit RX and is not transferred to the transmitting circuit TX. As such, by controlling the voltage applied to the control terminal 6, the transmission and reception can be switched.

Figure 15:
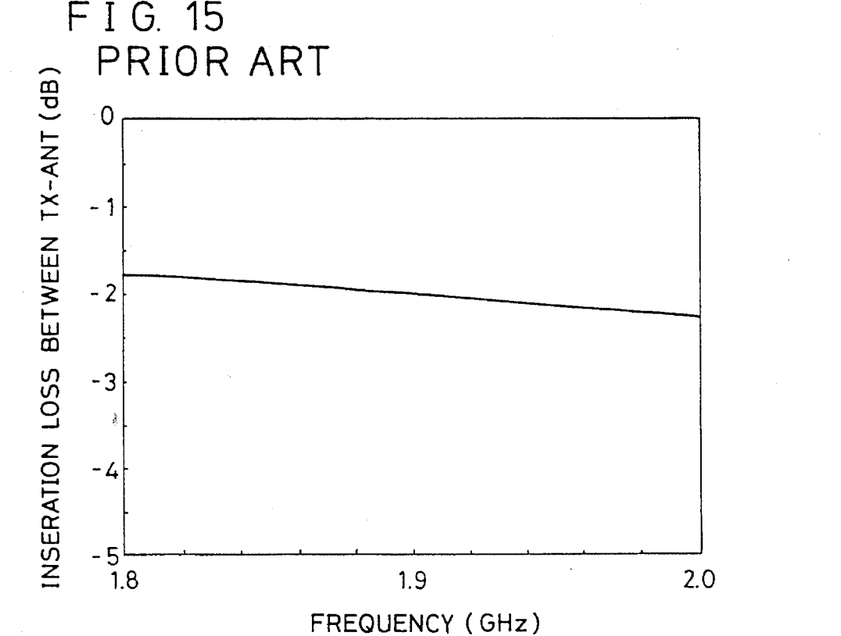
Figure 16:
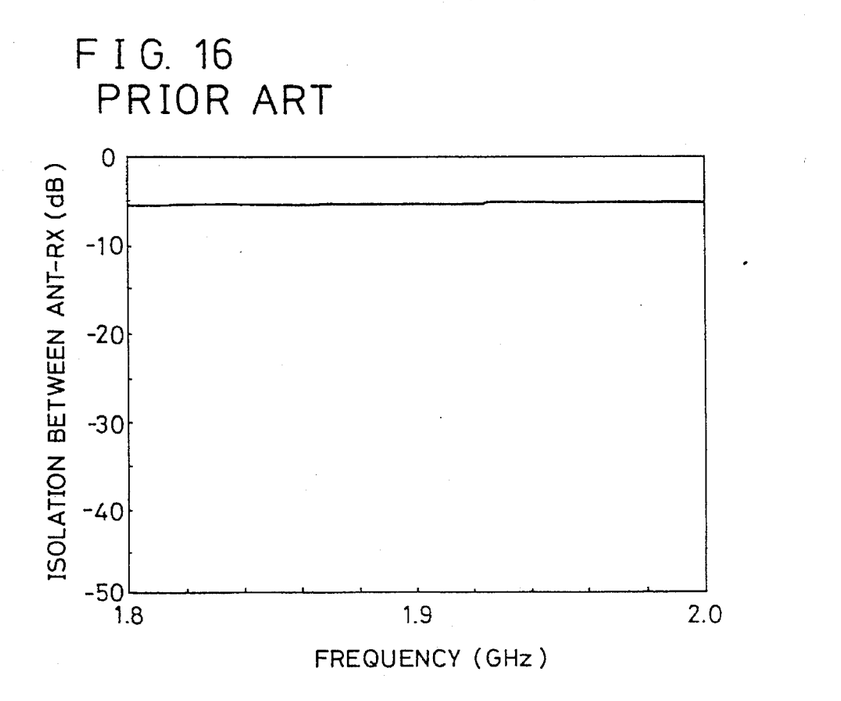

However, in a diode used in the high-frequency switch, complete conduction can not be attained when the diode is ON, and inductance exists. Though the transmitting circuit and the antenna are in conduction when the diode is ON, due to the inductance of the second diode, an impedance from a contact point A of the antenna and the second strip line to the receiving circuit RX side is not infinite, and hence the signal from the transmitting circuit leaks to the receiving circuit side, and as shown in FIG. 15, an insertion loss between the transmitting circuit and the antenna becomes larger. Also, as shown in FIG. 16, isolation between the antenna and the receiving circuit can not be secured.

Figure 17:
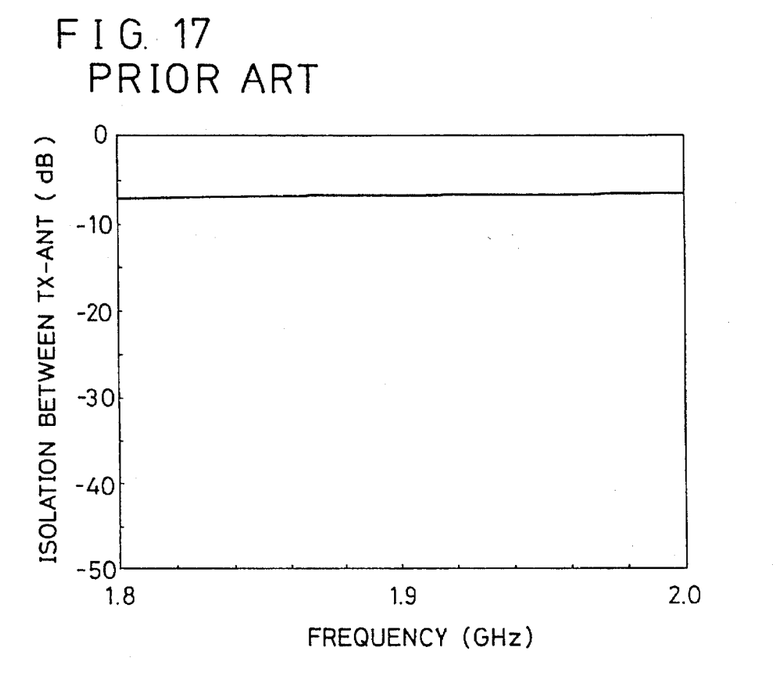
FIG. 17 is a graph showing frequency characteristics of an isolation between a transmitting circuit and an antenna, when diodes of a conventional high-frequency switch shown in FIG. 14 are OFF.
Figure 18:
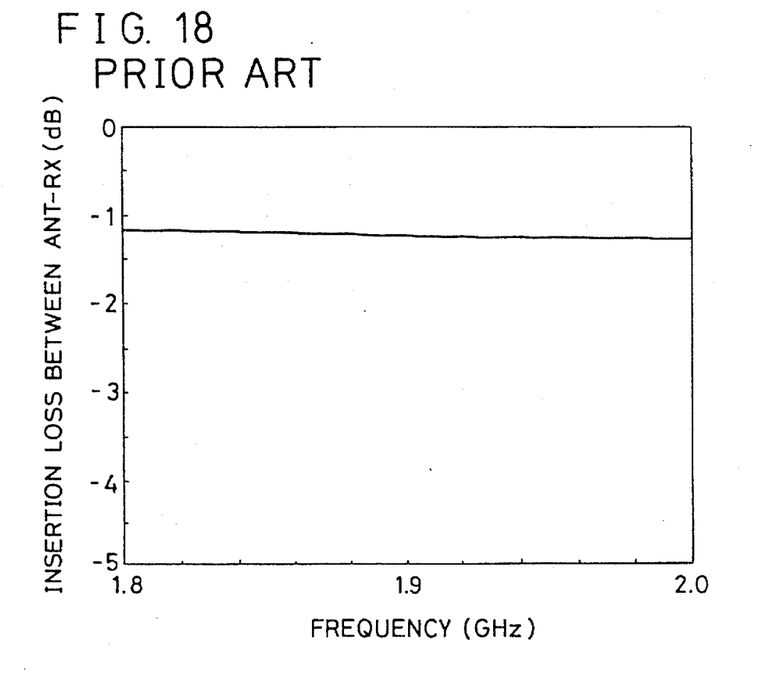
FIG. 18 is a graph showing frequency characteristics of an insertion loss between an antenna and a receiving circuit, when diodes of a conventional high-frequency switch shown in FIG. 14 are OFF.

When the diode is OFF, capacitance exists in the diode and complete insulation can not be attained. When the diode is OFF, though the antenna and the receiving circuit are in conduction, the reception signal from the antenna leaks to the transmitting circuit due to the capacitance of the first diode, and as shown in FIG. 17, isolation between the transmitting circuit and the antenna can not be secured. As shown in FIG. 18, since the reception signal leaks to the transmitting circuit side, an insertion loss between the antenna and the receiving circuit becomes larger. As such, due to the inductance or capacitance existing in the diode, the performance of the high-frequency switch is deteriorated.

SUMMARY OF THE INVENTION

It is, therefore, a primary object of the present invention to provide a high-frequency switch, in which effects due to inductance or capacitance the diodes are eliminated.

The present invention is directed to a high-frequency switch which is connected to a transmitting circuit, a receiving circuit and an antenna, for switching the connection between the transmitting circuit and the antenna, and the connection between the receiving circuit and the antenna, and comprises, a first diode whose anode is connected to the transmitting circuit side and whose cathode is connected to the antenna side, a strip line connected between the antenna side and the receiving circuit side, a second diode whose anode is connected to the receiving circuit side and whose cathode is connected to an earth side, a control terminal connected to the anode of the first diode for inputting a signal to control the first and second diodes, a capacitor connected to the second diode in series and a resistor connected to the capacitor in parallel.

The present invention is directed to a high-frequency switch which is connected to a transmitting circuit, a receiving circuit and an antenna, for switching the connection between the transmitting circuit and the antenna, and the connection between the receiving circuit and the antenna, and comprises, a first diode whose anode is connected to the transmitting circuit side and whose cathode is connected to the antenna side, a strip line connected between the antenna side and the receiving circuit side, a second diode whose anode is connected to the receiving circuit side and whose cathode is connected to an earth side, a control terminal connected to the anode of the first diode for inputting a signal to control the first and second diodes, and an inductor connected to the first diode in parallel.

The present invention is directed to a high-frequency switch which is connected to a transmitting circuit, a receiving circuit and an antenna, for switching the connection between the transmitting circuit and the antenna, and the connection between the receiving circuit and the antenna, and comprises, a first diode whose anode is connected to the transmitting circuit side and whose cathode is connected to the antenna side, a strip line connected between the antenna side and the receiving circuit side, a second diode whose anode is connected to the receiving circuit side and whose cathode is connected to an earth side, a control terminal connected to the anode of the first diode for inputting a signal to control the first and second diodes, an inductor connected to the first diode in parallel, a capacitor connected to the second diode in series and a resistor connected to the capacitor in parallel.

The present invention is directed to a high-frequency switch which is connected to a transmitting circuit, a receiving circuit and an antenna, for switching the connection between the transmitting circuit and the antenna, and the connection between the receiving circuit and the antenna, and comprises, a first diode whose anode is connected to the transmitting circuit side and whose cathode is connected to the antenna side, a strip line connected between the antenna side and the receiving circuit side, a second diode whose anode is connected to the receiving circuit side and whose cathode is connected to an earth side, a first control terminal connected to the anode of the first diode for inputting a signal to turn ON the first and second diodes, a second control terminal connected to the cathode of the second diode for inputting a signal to turn OFF the first and second diodes, an inductor connected to the first diode in parallel, a capacitor connected to the second diode in series, and resistors respectively connected to the first and second diodes in parallel for applying a signal inputted from the second control terminal to the first and second diodes.

By connecting the capacitor to the second diode in series, a series resonance circuit is formed with an inductance of the second diode and the capacitor. By connecting the inductor to the first diode in parallel, a parallel resonance circuit is formed with a capacitance of the first diode and the inductor.

According to the present invention, since the series resonance circuit is formed with the inductance of the second diode and the capacitor by connecting the capacitor to the second diode in series, an impedance from a contact point A of the antenna and the strip line to the receiving circuit RX side on transmission becomes infinite, and a transmission signal is not transferred to the receiving circuit side. Thus, an isolation between the antenna and the receiving circuit can be secured, and an insertion loss between the transmitting circuit and the antenna can be reduced.

Since the parallel resonance circuit is formed with the capacitance of the first diode and the inductor by connecting the inductor to the first diode in parallel, a sufficient isolation between the transmitting circuit and the antenna can be secured on reception. Thus, an insertion loss between the antenna and the receiving circuit can be reduced.

Furthermore, by connecting the inductor to the first diode in parallel and the capacitor to the second diode in series, both characteristics on transmission and reception can be improved.

The parallel resonance circuit is formed by connecting the first diode, capacitor and inductor in parallel. By connecting the capacitor to the first diode in parallel, a resultant capacitance of the resonance circuit becomes larger. Thus, a rate of capacitance variations of the first diode against the total capacitance becomes smaller as compared with the case where the capacitor is not connected.

Since the parallel resonance circuit is formed by connecting the first diode, capacitor and inductor in parallel, a sufficient isolation can be secured between the transmitting circuit and the antenna on reception. Thus, an insertion loss between the antenna and the receiving circuit can be reduced. At this time, since the rate of capacitor variations of the first diode against the total capacitance is small, fluctuations on resonance frequency of the parallel resonance circuit have no appreciable effect. And hence, a high-frequency switch having a stable performance can be obtained.

The signal inputted from the second control terminal is divided by the resistors respectively connected to the first and second diodes in parallel, and is applied to the respective diodes. By this voltage, the first and second diodes can be surely turned OFF.

The above and other objects, features, aspects and advantages of the present invention will become more apparent from the following detailed description of the embodiment made with reference to the drawings.

BRIEF DESCRIPTION OF THE DRAWINGS

FIG. 2 is a graph showing frequency characteristics of an insertion loss between a transmitting circuit and an antenna, when diodes of a high-frequency switch shown in FIG. 1 are ON.

FIG. 3 is a graph showing frequency characteristics of an isolation between an antenna and a receiving circuit, when diodes of a high-frequency switch shown in FIG. 1 are ON.

FIG. 12 is a plan view showing a state where a high-frequency switch shown in FIG. 9 or FIG. 11 is illustrated in chip components.

FIG. 15 is a graph showing frequency characteristics of an insertion loss between a transmitting circuit and an antenna, when diodes of a conventional high-frequency switch shown in FIG. 14 are ON.

FIG. 16 is a graph showing frequency characteristics of an isolation between an antenna and a receiving circuit, when diodes of a conventional high-frequency switch shown in FIG. 14 are ON.

DESCRIPTION OF THE PREFERRED EMBODIMENTS

Figure 1:
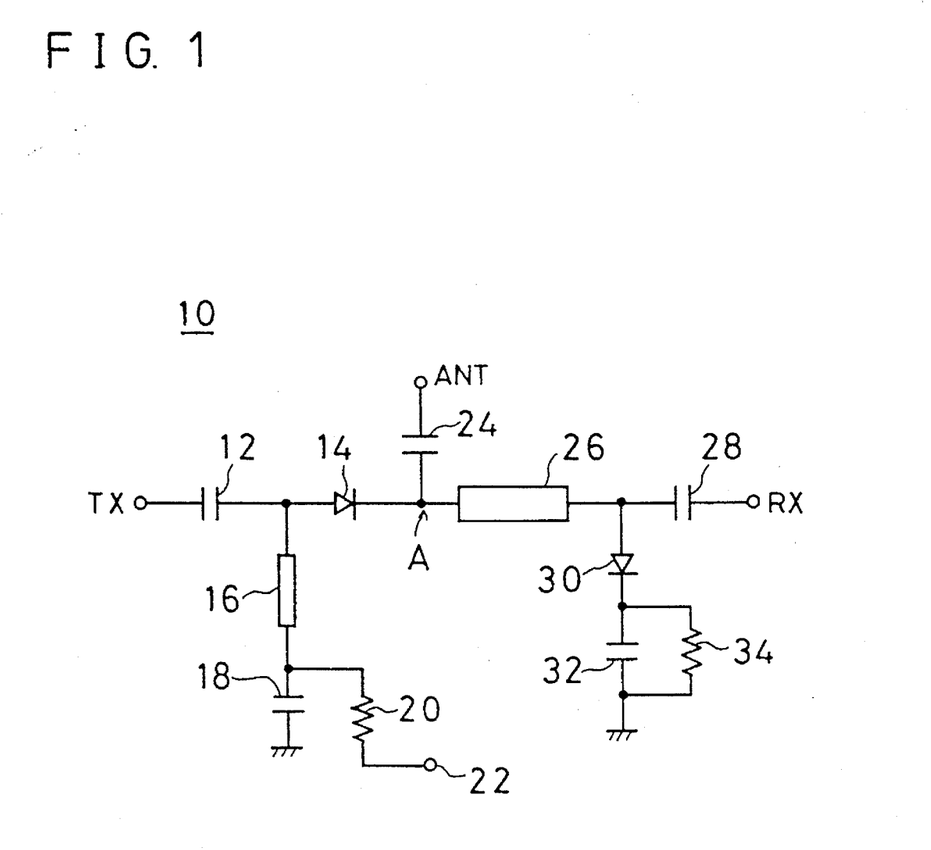
FIG. 1 is a circuit diagram showing one embodiment of the present invention.

FIG. 1 is a circuit diagram showing one embodiment of the present invention. A high-frequency switch 10 is used for switching the transmission and reception of a digital portable telephone and the like. Thus, the high-frequency switch 10 is connected to an antenna ANT, a transmitting circuit TX and a receiving circuit RX. The transmitting circuit TX is connected to an anode of a first diode 14 via a capacitor 12. The anode of the first diode 14 is grounded via a first strip line 16 serving as a choke coil and a capacitor 18. An intermediate point between the first strip line 16 and the capacitor 18 is connected to a first control terminal 22 via a resistor 20. A cathode of the first diode 14 is connected to the antenna ANT via a capacitor 24. The same result is obtained by connecting a resistor in place of the first strip line 16 and the capacitor 18 in an example of circuit of FIG. 1.

A second strip line 26 is connected to the antenna ANT. The second strip line 26 is connected to the receiving circuit RX via a capacitor 28. An intermediate point between the second strip line 26 and the capacitor 28 is grounded via a series circuit of a second diode 30 and a capacitor 32. A resistor 34 is connected to the capacitor 32 in parallel.

When the high-frequency switch 10 is used for transmission, a positive voltage is applied to the first control terminal 22. At this time, a circuit consisting of the resistor 20, first strip line 16, first diode 14, second strip line 26, second diode 30 and resistor 34 connected in series is formed between the first control terminal 22 and an earth. The voltage applied to the first control terminal 22 is applied to the first diode 14 and the second diode 30 as a forward bias voltage, thereby the diodes 14 and 30 are turned ON. Thus, a transmission signal from the transmitting circuit TX is transmitted from the antenna ANT, and the second strip line 26 is grounded by the second diode 30 and resonates to bring its impedance infinite, so that it is not transferred to the receiving circuit RX side.

Though the first diode 14 and the second diode 30 are ON at transmission, the inductance exists in the diodes. When such inductance exists, the impedance from the contact point A of the antenna ANT and the second strip line 26 to the receiving circuit RX side is not infinite. In order to eliminate such effect by the inductance, a series resonance circuit is formed by the inductance of the second diode 30 and the capacitor 32. Thus, a capacitance C of the capacitor 32 is represented by the following Formula, $$C=1/\{(2\pi f)^2 L_D\}$$

where, $L_D$ . . . inductance of the second diode 30 f . . . used frequency

Figure 2:
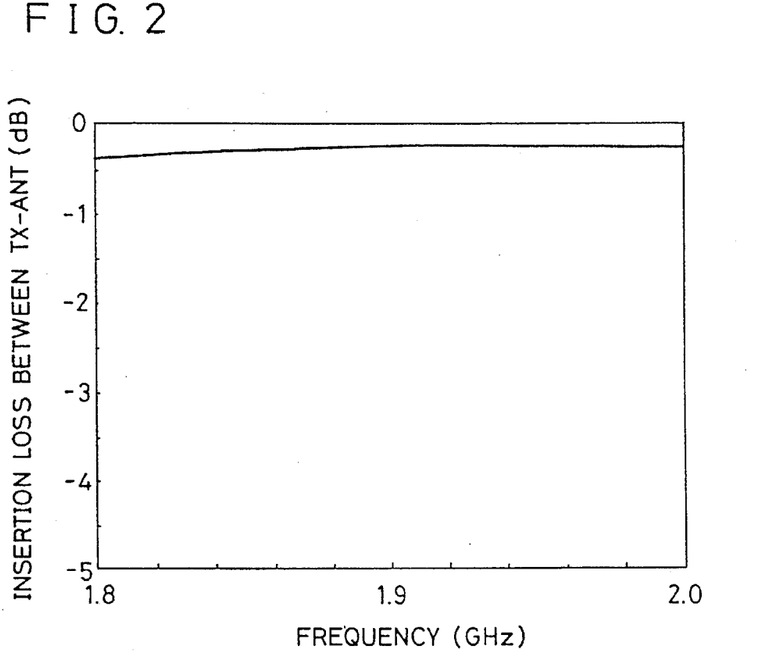
Figure 3:
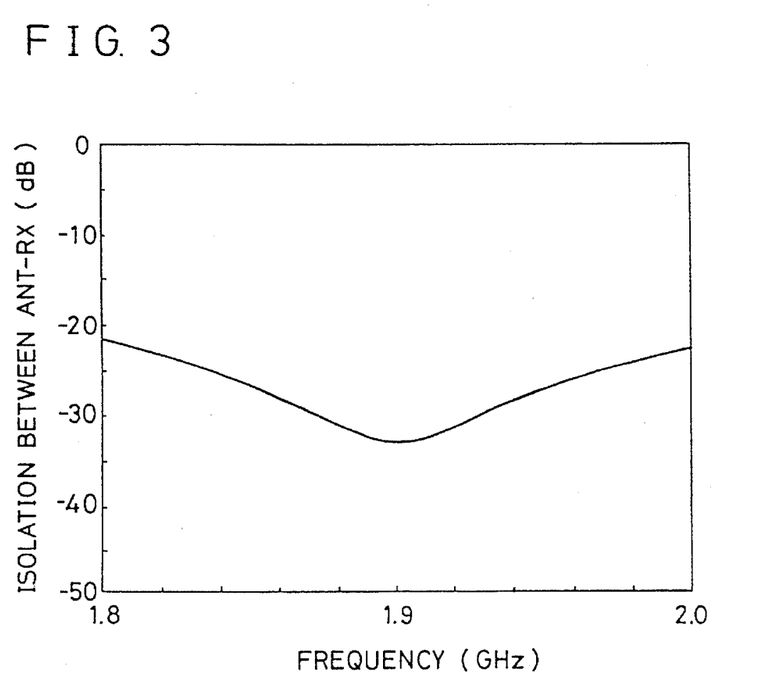

By setting the capacitance C of the capacitor 32 to meet the above Formula, when the second diode 30 is ON, the series resonance circuit is formed, and the impedance from the contact point A of the antenna ANT and the second strip line 26 to the receiving circuit RX side is made infinite. Thus, a signal from the transmitting circuit TX is not transferred to the receiving circuit RX, and as shown in FIG. 2, an insertion loss between the transmitting circuit TX and the antenna ANT can be reduced. Furthermore, as shown in FIG. 3, a good isolation can be secured between the antenna ANT and the receiving circuit RX. When the voltage is applied to the first control terminal 22, an electric current is cut by the capacitors 12, 18, 24, 28 and 32 and flows only to a circuit including the first diode 14 and the second diode 30, thus the other portions are not effected.

Figure 4:
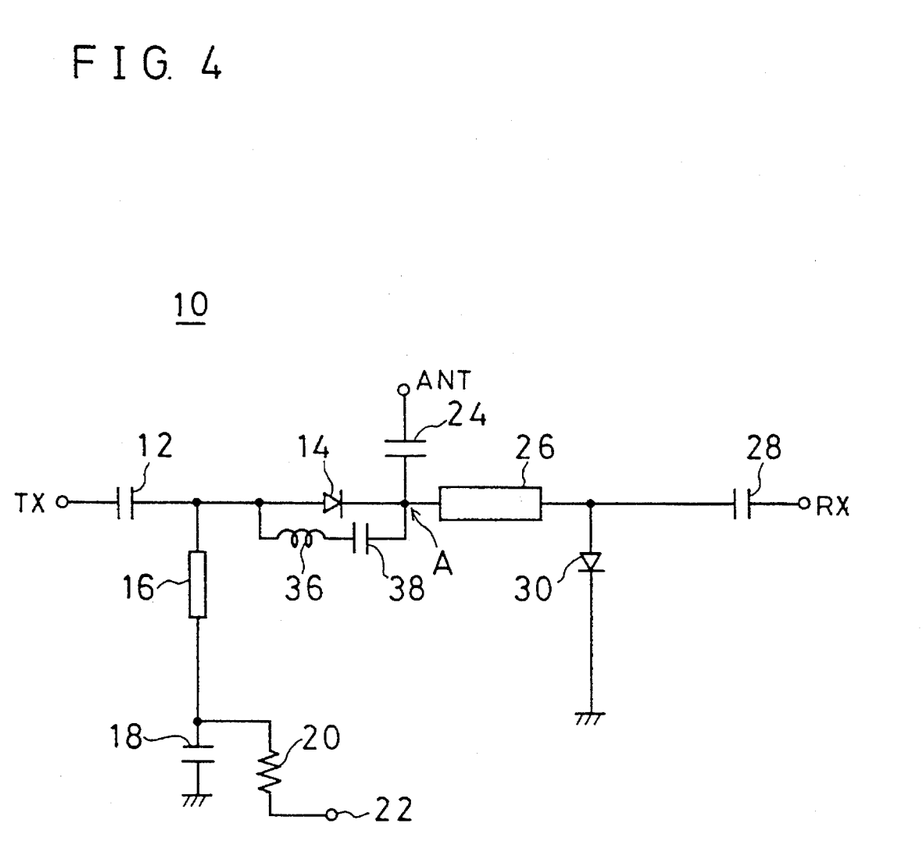
FIG. 4 is a circuit diagram showing another embodiment of the present invention.

When the high-frequency switch 10 is used for reception, a voltage applied to the first control terminal 22 is stopped. Thereby, the first diode 14 and the second diode 30 are turned OFF, and a reception signal is transferred to the receiving circuit RX. At this time, since the capacitance exists in the diode, there is the possibility that the reception signal may leak to the transmitting circuit TX side. In order to prevent such reception signal leak, a high-frequency switch as shown in FIG. 4 is used. In this high-frequency switch 10, an inductor 36 is connected to the first diode 14 in parallel. By the inductor 36 and the capacitance of the first diode 14, a parallel resonance circuit is formed. Thus, an inductance L of the inductor 36 is represented by the following Formula, $$L=1/\{(2\pi f)^2 C_D\}$$

where, $C_D$ . . . capacitance of the first diode 14 f . . . used frequency

Figure 5:
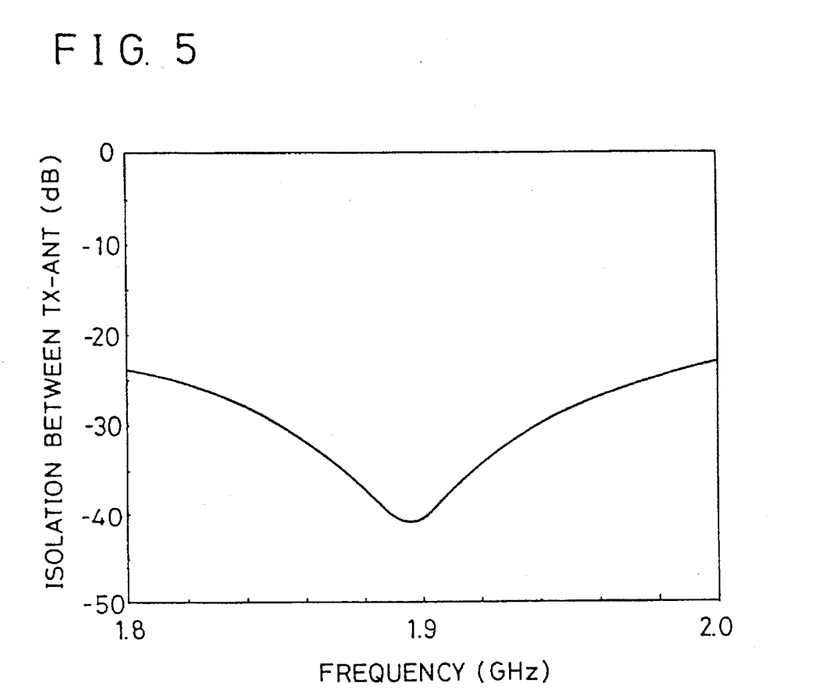
FIG. 5 is a graph showing frequency characteristics of an isolation between a transmitting circuit and an antenna, when diodes of a high-frequency switch shown in FIG. 4 are OFF.
Figure 6:
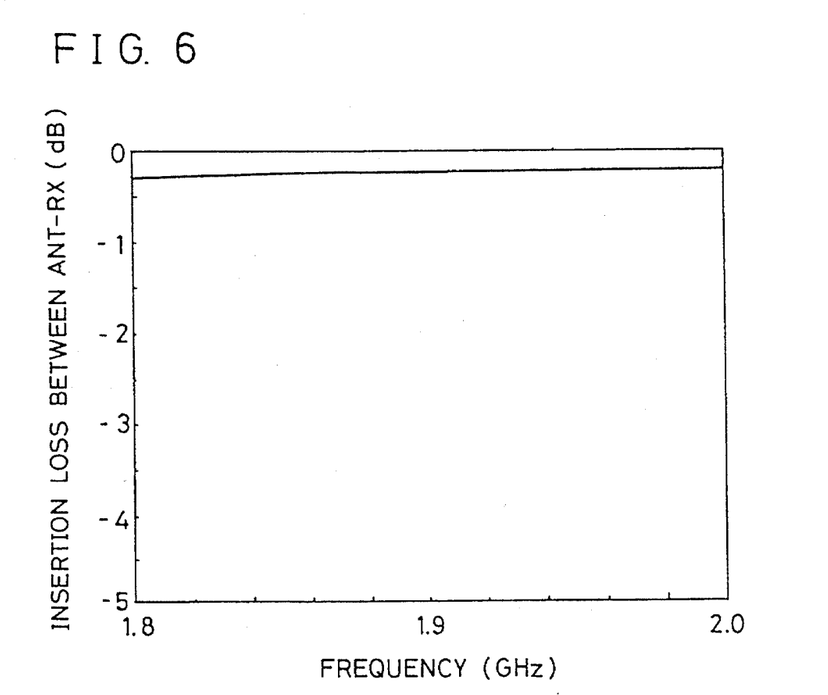
FIG. 6 is a graph showing frequency characteristics of an insertion loss between an antenna and a receiving circuit, when diodes of a high-frequency switch shown in FIG. 4 are OFF.

By setting the inductance L of the inductor 36 to meet the above Formula, as shown in FIG. 5, an isolation between the transmitting circuit TX and the antenna ANT can be improved. Thus, the reception signal does not leak to the transmitting circuit TX side, and as shown in FIG. 6, an insertion loss between the antenna ANT and the receiving circuit RX can be reduced. The same effect can be obtained by using a high impedance transmission line in place of the inductor 36. In this embodiment, in order to prevent the electric current from flowing through the inductor 36 at the time of applying the voltage to the first control terminal, a capacitor 38 is connected to the inductor 36 in series. When connecting the capacitor 38, it is to be understood that the above Formula is corrected responding to the capacitance when necessary.

Figure 7:
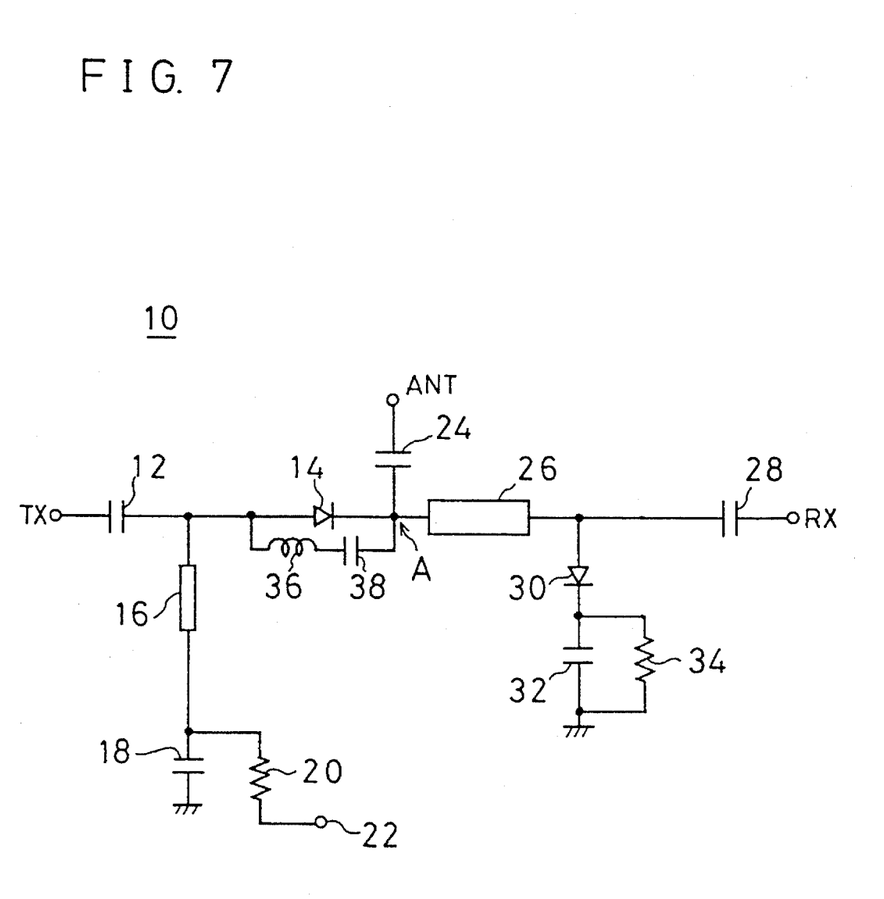
FIG. 7 is a circuit diagram showing still another embodiment of the present invention.

As shown in FIG. 7, by connecting the inductor 36 to the first diode 14 in parallel and the capacitor 32 to the second diode 30 in series, the high-frequency switch 10 having a good characteristics on both the transmission and reception can be obtained. In the embodiment shown in FIG. 8, in order to turn OFF the first diode 14 and the second diode 30 surely on reception, a resistor 40 is connected to the first diode 14 in parallel, and a resistor 42 is connected to the second diode 30 in parallel. The resistor 42 is connected to a second control terminal 46 via a separate resistor 44.

Figure 8:
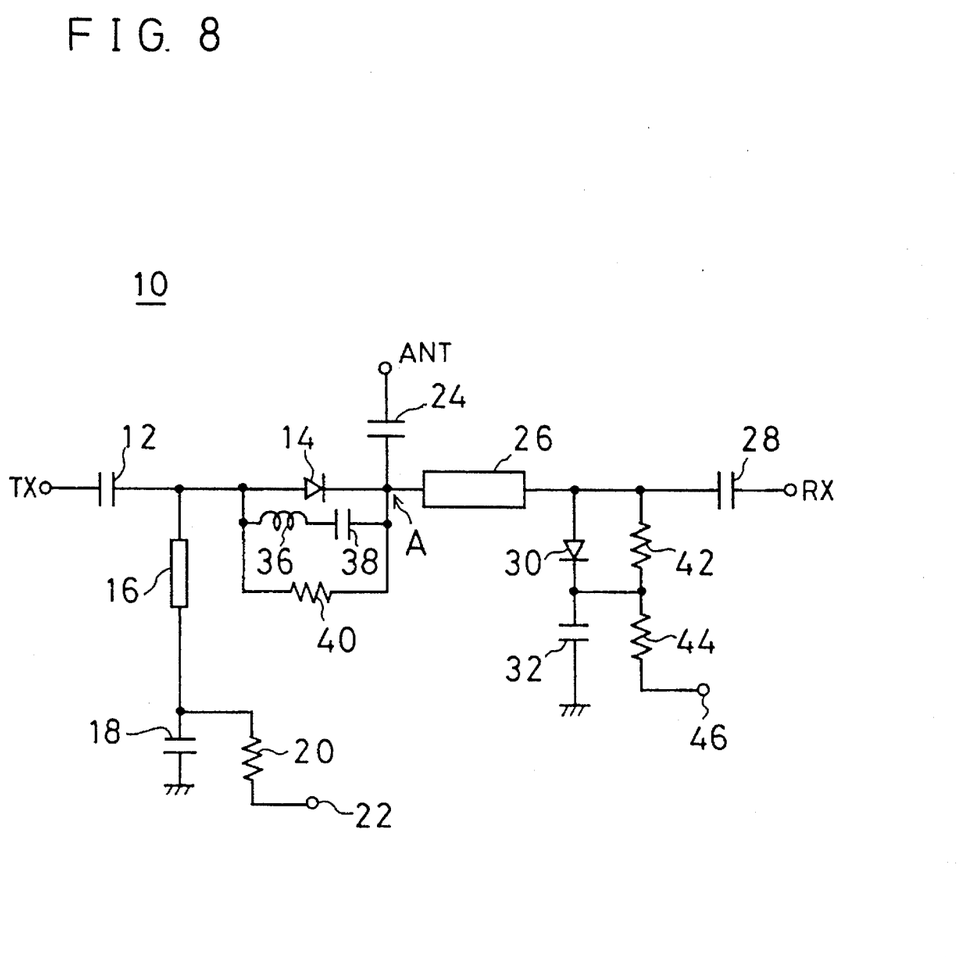
FIG. 8 is a circuit diagram showing a modified example of a high-frequency switch shown in FIG. 7.

When the high-frequency switch 10 is used for reception, the voltage applied from the first control terminal 22 is stopped, and a positive voltage is applied to the second control terminal 46. The voltage applied to the second control terminal 46 is divided by the resistors 40, 42 and applied to the first diode 14 and the second diode 30 as a backward voltage. And hence, the first diode 14 and the second diode 30 are surely maintained in the OFF state. Thus, a received signal is transferred to the receiving circuit RX and is not transferred to the transmitting circuit TX.

When the circuits shown in FIG. 7 and FIG. 8 are used for reception, since the parallel resonance circuit is formed with the first diode 14 and the inductor 36, an isolation between the transmitting circuit TX and the antenna ANT can be improved. Furthermore, since the series resonance circuit is formed with the second diode 30 and the capacitor 32 at transmission, an isolation between the antenna ANT and the receiving circuit RX can be improved. Thus, the insertion loss between the transmitting circuit TX and the antenna ANT can be reduced.

Figure 9:
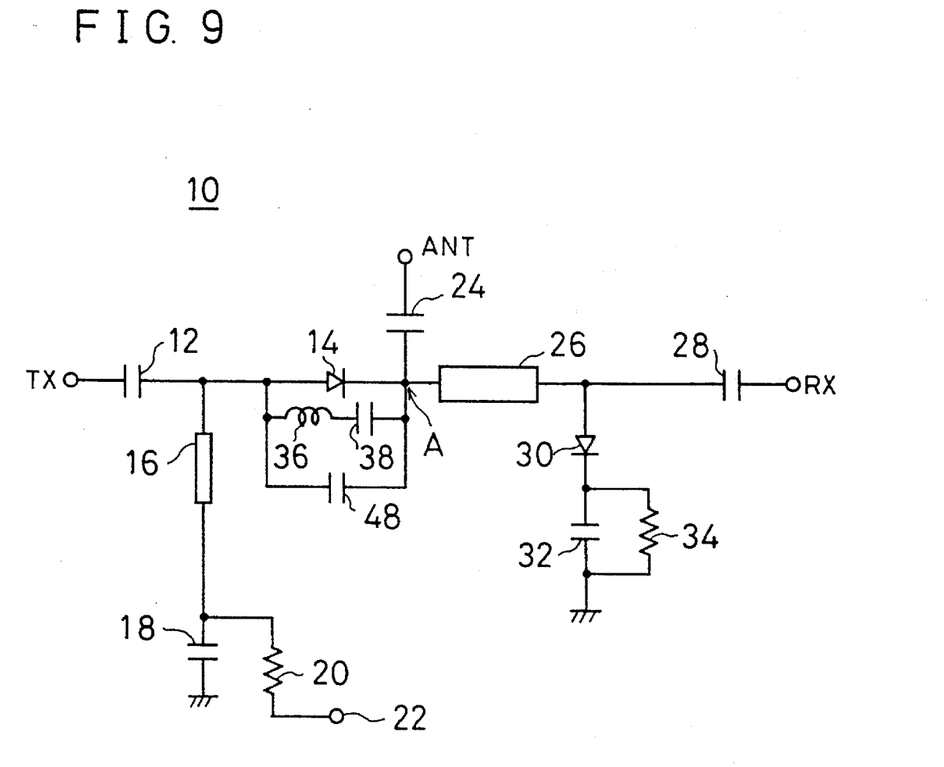
FIG. 9 is a circuit diagram of a separate embodiment of the present invention.
Figure 10:
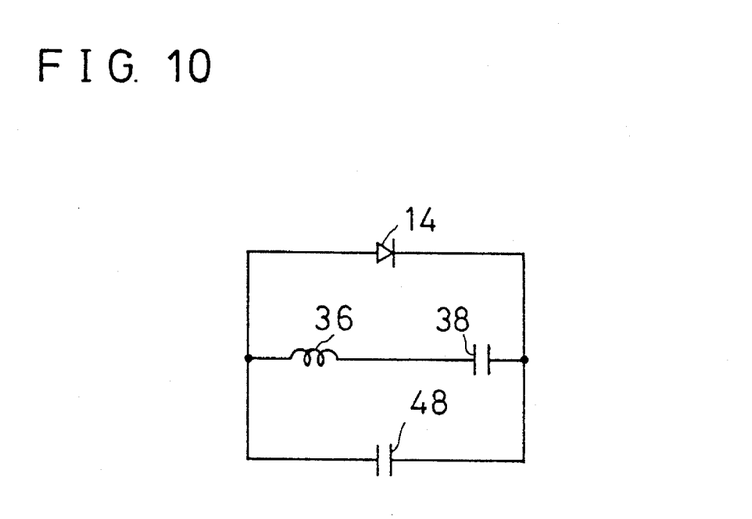
FIG. 10 is a circuit diagram showing an essential portion of a high-frequency switch shown in FIG. 9.

However, in the inductance and capacitance of the diodes, there are variations in the individual diodes. Particularly, by the variations of the capacitance, the resonance frequency of the parallel resonance circuit formed with the inductor 36 changes. In order to prevent such inconvenience, as shown in FIG. 9, a capacitor 48 is connected to the first diode 14 and the inductor 36 in parallel. In this high-frequency switch 10, as shown in FIG. 10, since the first diode 14 and the capacitor 48 are connected in parallel, its resultant capacitance becomes larger. For example, the resultant capacitance $C=C1+C_D$, where C1 is the capacitance of the capacitor and $C_D$ is the capacitance of the first diode 14. When variations of the capacitance of the first diode 14 is $C_{DS}$, the variations against the total capacitance is $C_{DS}/(C1+C_D)$. When the capacitor 48 is not connected, the rate of variations against the total capacitance is $C_{DS}/C_D$, so that effects of the capacitance variations can be reduced by connecting the capacitor 48. Thus, the high-frequency switch 10 having a stable performance can be obtained.

Figure 11:
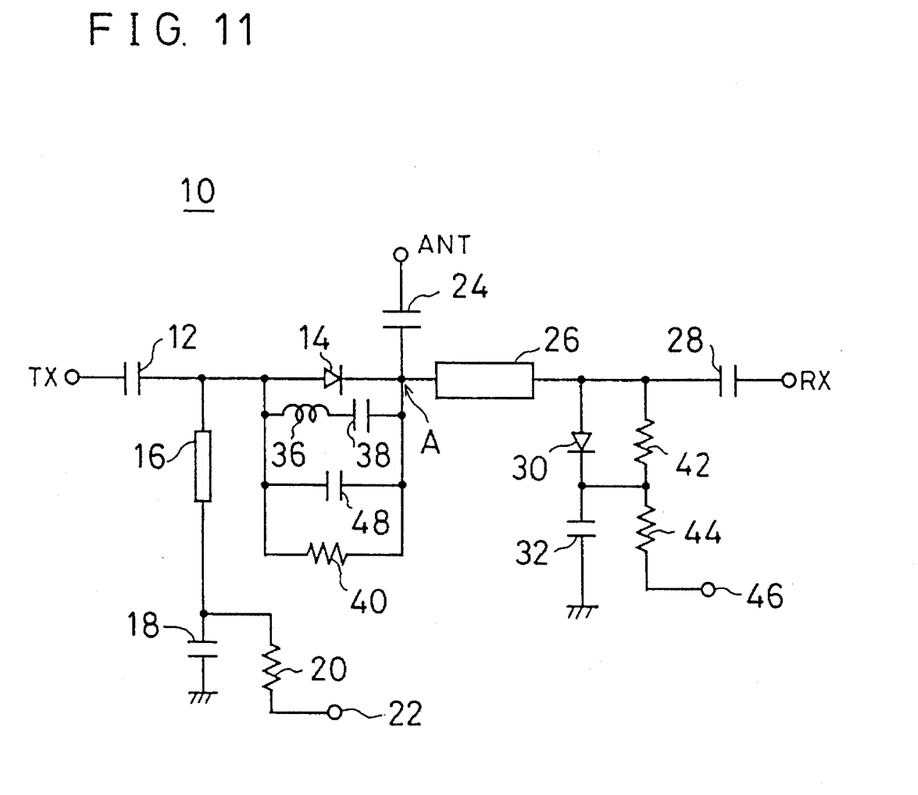
FIG. 11 is a circuit diagram showing a modified example of a high-frequency switch shown in FIG. 9.

Also in such high-frequency switch 10, it is to be understood that the first control terminal 22 and the second control terminal 46 may be provided, as shown in FIG. 11, to bring the first diode 14 and the second diode 30 surely to the OFF state.

Figure 12:
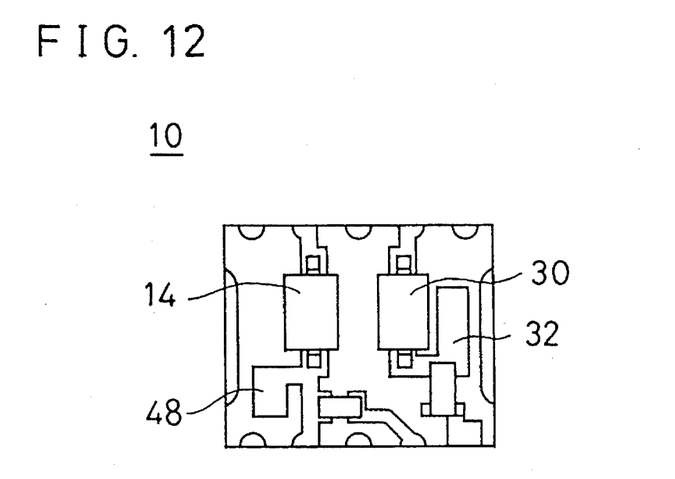

As shown in FIG. 12, the high-frequency switch 10 may be constituted by laminate-type chip components. In this case, though a number of passive elements are built in, the first diode 14, second diode 30 and so on are installed on the upper face of the chip components. The capacitor 48 forming the parallel resonance circuit and the capacitor 32 forming the series resonance circuit may be constituted by forming electrodes sandwiching a dielectric layer of the chip components. Thus, by trimming the electrodes constituting the capacitances 48 and 32, an optimum capacitance can be obtained. Such trimming is effected by measuring the capacitance of the diodes and characteristics of the high-frequency switch, and shaving the electrode on the surface side by a laser or a sand-blast.

Though the electrode being trimmed is formed on the surface of the chip components in the high-frequency switch shown in FIG. 12, it may also be formed near a surface layer which can just about be shaved within the chip components.

As such, by reducing the effect of variations of the diodes, necessity of the trimming is reduced and the high-frequency switch having a stable characteristics can be obtained at low cost. When a trimming pattern for correcting the variations of the diodes is formed, the high-frequency switch having a further stable characteristics can be obtained. Furthermore, the high-frequency switch necessitating a stable characteristics at high frequency can be constituted by surface-mounting type components, contributing to miniaturization and improvement of reliability of the portable telephone.

While the present invention has been particularly described and shown, it is to be understood that such description is used merely as an illustration and example rather than limitation, and the spirit and scope of the present invention is determined solely by the terms of the appended claims.

What is claimed is:

1. A high-frequency switch for being connected to a transmitting circuit, a receiving circuit and an antenna for switching a connection between said transmitting circuit and said antenna, and a connection between said receiving circuit and said antenna, comprising;
   a first diode whose anode is connected to a transmitting circuit terminal and whose cathode is connected to an antenna terminal;
   a strip line connected between said antenna terminal and said receiving circuit terminal;
   a second diode whose anode is connected to said receiving circuit terminal and whose cathode is connected to ground;
   a first control terminal connected to the anode of said first diode for inputting a signal to turn ON said first diode and said second diode;
   a second control terminal connected to the cathode of said second diode for inputting a signal to turn OFF said first diode and said second diode;
   an inductor connected to said first diode in parallel;
   a capacitor connected in series between said cathode of said second diode and ground; and
   at least one resistor respectively connected in parallel with each of said first diode and said second diode, for applying a signal inputted from said second control terminal to said first diode and said second diode.

2. A high-frequency switch in accordance with claim 1, which further comprises a capacitor connected to said inductor in series.

3. A high-frequency switch in accordance with claim 2, which further comprises a separate capacitor connected to said first diode in parallel.

4. A high-frequency switch in accordance with claim 1, wherein said first control terminal is connected to the anode of said first diode via a separate strip line.

5. A high-frequency switch in accordance with claim 2, wherein said first control terminal is connected to the anode of said first diode via a separate strip line.

6. A high-frequency switch in accordance with claim 3, wherein said first control terminal is connected to the anode of said first diode via a separate strip line.

7. A high-frequency switch in accordance with claim 1, further comprising a resistor connected in series between said cathode of said second diode and said second control terminal.

8. A high-frequency switch in accordance with claim 7, further comprising a resistor connected in series between said anode of said first diode and said first control terminal.

9. A high-frequency switch for being connected to a transmitting circuit, a receiving circuit and an antenna for switching a connection between said transmitting circuit and said antenna, and a connection between said receiving circuit and said antenna, comprising:
   a first diode whose anode is connected to a transmitting circuit terminal and whose cathode is connected to an antenna terminal;
   a strip line connected between said antenna terminal and a receiving circuit terminal;
   a second diode whose anode is connected to said receiving circuit terminal and whose cathode is connected to ground;
   a control terminal connected to the anode of said first diode for inputting a signal to control said first diode and said second diode;
   a series circuit of an inductor and a capacitor connected in parallel with said first diode; and
   a separate capacitor connected in parallel with said first diode.

10. A high-frequency switch for being connected to a transmitting circuit, a receiving circuit and an antenna for switching a connection between said transmitting circuit and said antenna, and a connection between said receiving circuit and said antenna, comprising:
   a first diode whose anode is connected to a transmitting circuit terminal and whose cathode is connected to an antenna terminal;
   a strip line connected between said antenna terminal and a receiving circuit terminal;
   a second diode whose anode is connected to said receiving circuit terminal and whose cathode is connected to ground;

a first control terminal connected to the anode of said first diode for inputting a signal to turn ON said first diode and said second diode;

a second control terminal connected to the cathode of said second diode for inputting a signal to turn OFF said first diode and said second diode;

a resistor connected in parallel with said first diode for applying a signal inputted from said second control terminal across said first diode; and a separate resistor connected in parallel with said second diode for applying a signal inputted from said second control terminal across said second diode.

11. A high-frequency switch in accordance with claim 10, further comprising an inductor connected in parallel with said first diode.

12. A high-frequency switch in accordance with claim 11, further comprising a capacitor connected in series with said inductor.

13. A high-frequency switch in accordance with claim 12, further comprising a separate capacitor connected in parallel with said first diode.

* * * * *